Aug. 4, 1936. J. P. ALEXANDER Re. 20,057
CONTAINER TOP
Original Filed Sept. 3, 1931 2 Sheets-Sheet 1
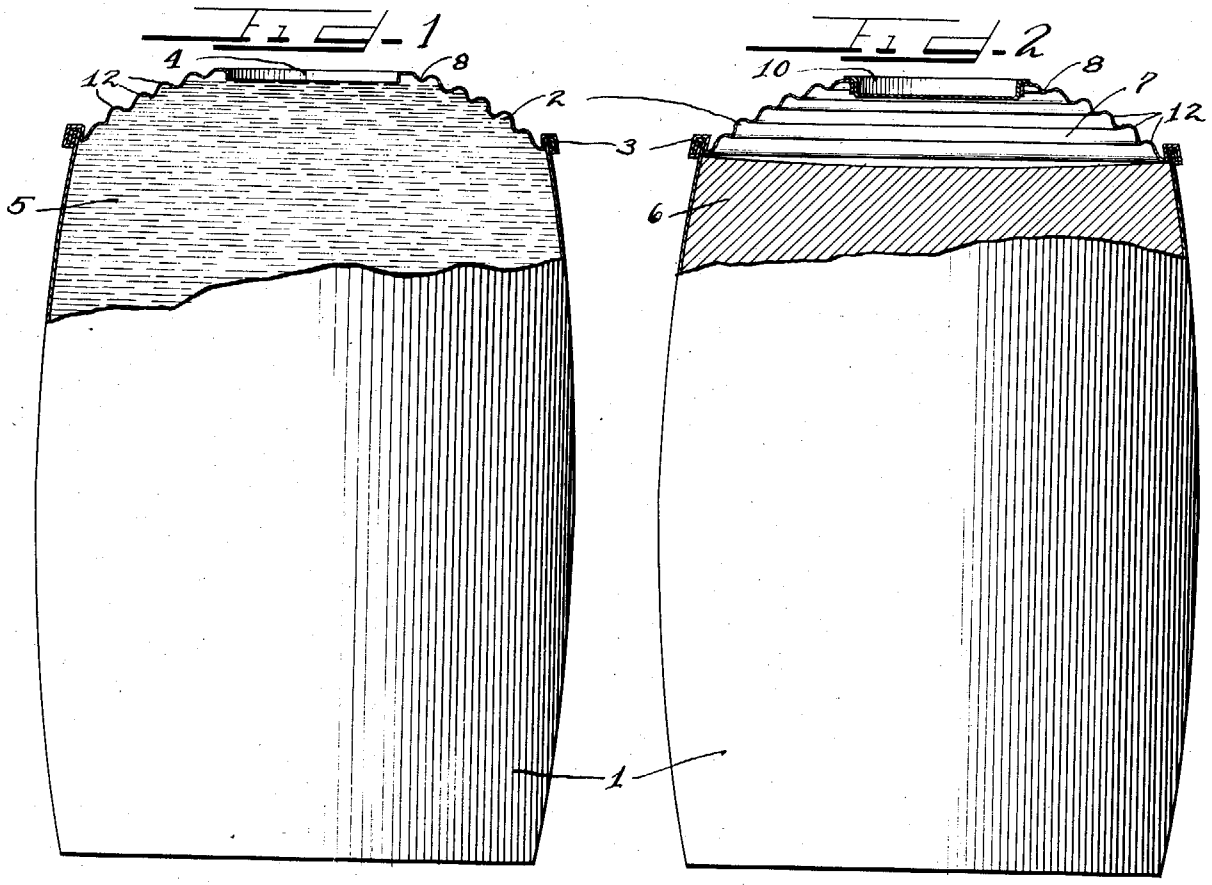
Inventor
Joseph P. Alexander.
Charles Stilles
By Atty.

Aug. 4, 1936. J. P. ALEXANDER Re. 20,057
CONTAINER TOP
Original Filed Sept. 3, 1931 2 Sheets-Sheet 2
Fig. 3
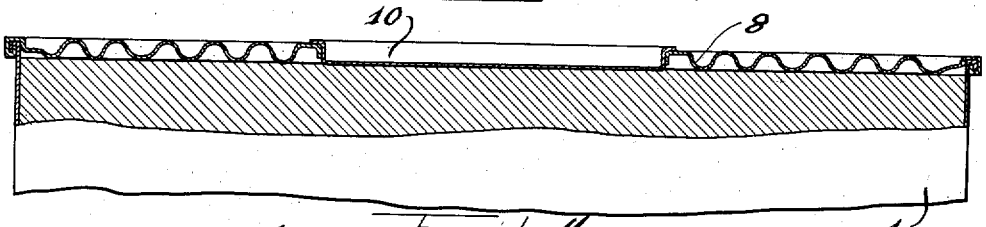
Fig. 4
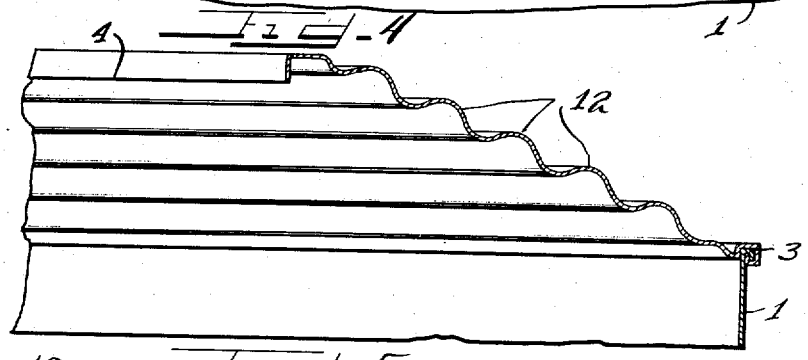
Fig. 5
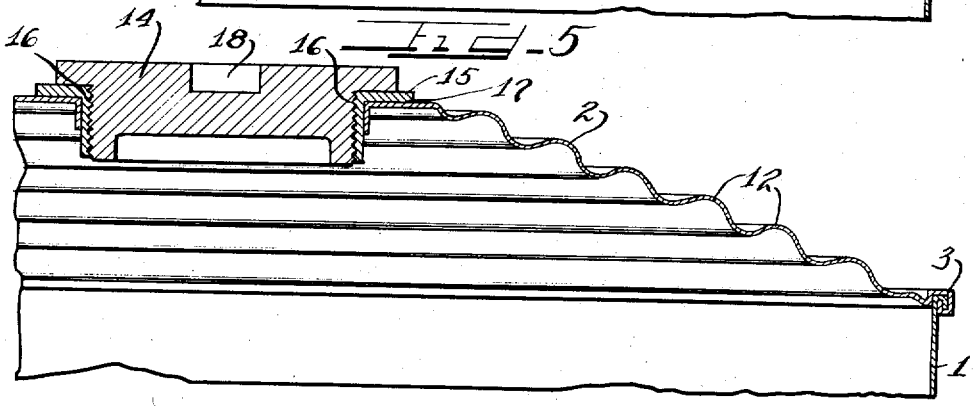
Fig. 6
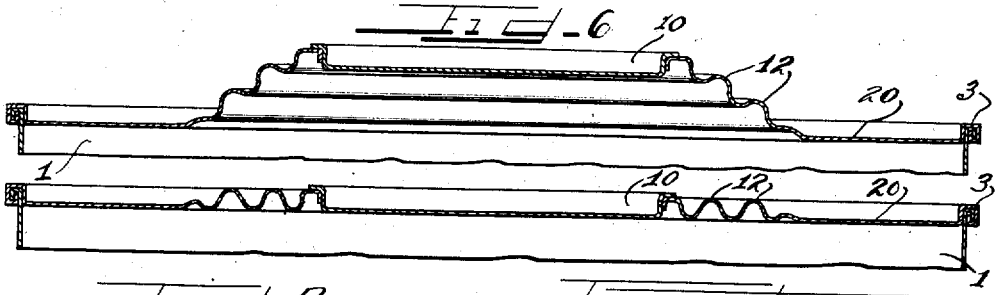
Fig. 7
Inventor
Joseph P. Alexander.
by Charles Hills
Atty.

Reissued Aug. 4, 1936

Re. 20,057

UNITED STATES PATENT OFFICE 20,057

CONTAINER TOP

Joseph P. Alexander, Pensacola, Fla., assignor, by mesne assignments, to Newport Industries, Inc., a corporation of Delaware Original No. 1,913,652, dated June 13, 1933, Serial No. 560,910, September 3, 1931. Application for reissue February 11, 1935, Serial No. 7,243

5 Claims. (Cl. 220—66)

This invention relates to an improved top or cover for containers and includes a novel method of packaging materials.

More specifically, this invention relates to a collapsible barrel top or metallic receptacle head which is capable of assuming a flattened position from an apexed original position.

In the packaging of materials which are in an expanded state when first inserted into the container and which assume a final volume less than when originally inserted, a partially filled package results. This condition is most frequently met with in the packaging of materials which are hot expanded liquids when first placed into the container and which contract and/or solidify upon cooling. Materials exhibiting these properties include, for example, tars, pitches, resins, chemicals such as caustic soda, phenol, and the like. Therefore, filling a container to the very top with the hot expanded liquid does not result in a completely filled container after said material has cooled.

Also, in the packaging of finely comminuted solids or spongy bulky material, the complete filling of the container seldom results in a completely filled package after the container has been allowed to stand and the contents permitted to settle.

Rosin, as a specific example of a material which is a hot expanded liquid when first packaged and solidifies upon cooling, is frequently packaged for shipment in light weight metal containers made of 28 to 30 gage plain or galvanized iron. The usual design for such a container is a cylindrical or barrel shaped vessel with a flat bottom and flat top. The top is equipped with an opening of any suitable diameter through which the container is filled. This opening is later sealed with a lid or cap.

In operation, the container is filled level full with hot liquid rosin, but when the rosin is cold and has solidified, the volume is found to have decreased appreciably. This results in an empty space in the top of the container. In large scale commercial operation, it is not convenient or practicable to refill the drums by inserting additional molten rosin into the empty space.

A partially filled rosin container has many disadvantages and results in great waste. For example, if an empty space is allowed to remain in the top of the container and the container is sealed for shipping, the light metal surrounding the cavity at the top is easily crushed and frequently results in a loosening or complete detachment of the entire top of the container. If this happens, the contents of the container might be lost, become contaminated and otherwise damaged. Furthermore, a partially filled container requires additional space for the storage of a given amount of rosin.

If the damage to the container itself is not pronounced, it is probable that the cavity in the container will become filled with water or some other undesirable foreign material and thereby damage the rosin.

The present invention provides a novel form of container construction which obviates all the objections heretofore encountered in the packaging of materials of the class described above.

It is therefore an object of this invention to provide a novel container structure capable of assuming a contracted position to compensate for any decrease in volume of the contents of the container.

It is another object of this invention to provide a novel process for the packaging of expanded materials which process insures a completely filled container without the necessity of refilling upon contraction of the contents.

It is a further important object of this invention to provide a collapsible container top which may be brought into contracted position without damage to the container structure.

It is a specific object of this invention to provide a collapsible barrel top having in its distended position an apexed shape and capable without damage to the barrel of assuming a retracted position upon the application of outside pressure upon the top of the apex.

Other and further objects of this invention will be apparent from the disclosures in the specification and the accompanying drawings.

This invention (in a preferred form) is illustrated in the drawings and hereinafter more fully described.

On the drawings:

Figure 1 is an elevational view, with parts broken away, of a container illustrating a preferred form of the invention and showing the contents of the container in expanded form.

Figure 2 is an elevational view of the container, with parts broken away, showing the contents of the container in contracted form.

Figure 3 is a fragmentary elevational view, with parts in section, of the container top in retracted position level with the contracted contents of the container.

Figure 4 is an enlarged detailed sectional view of the container top.

Figure 5 is an enlarged detailed sectional view of an alternative form of container top especially useful in the packaging of liquids which do not solidify upon contraction.

Figure 6 is a sectional view of a container end included in this invention in which only a portion thereof is distended and capable of being collapsed.

Figure 7 is a sectional view showing the container end of Figure 6 in retracted or collapsed form.

As shown on the drawings:

The reference numeral 1 indicates the container body equipped with a collapsible convex or dome shaped top 2 according to the invention and sealed thereto by any means, such as by a reversed flange joint 3. The collapsible container top 2 is equipped with an opening 4 through which the container is filled.

The collapsible container top 2, as disclosed, has a corrugated surface 12 made up of concentric symmetrical corrugations. However, it should be understood that my invention is not limited to the particular design shown in the drawings. The container top may assume a pyramid shape if a rectangular or square container is used. Furthermore, an oval shaped or any shaped top may be used to fit a correspondingly shaped container. The corrugations may or may not be symmetrically concentric. For example, they may radiate from the opening 4.

As shown in Figure 1, the reference numeral 5 indicates an expanded material completely filling the container up to the opening 4. Figure 2 discloses the same material after it has cooled and assumed a position shown by the reference numeral 6. A hollow space 7 thereby results between the top surface of the contents and the top of the container.

As shown in Figures 2, 3, 6 and 7, the opening 4 may be fitted with a lid or cover 10 engaged therein in a tight frictional fit. This lid or cover 10 may be inserted as soon as the container has been filled with hot, expanded material or it may not be inserted until after the contents of the container have contracted and solidified as shown in Figure 2.

After the lid 10 has been inserted in the opening 4 and the contents of the container have assumed their contracted position, pressure is applied to the outside surface of the apexed container top, for example, by standing the container on the collapsible top end, whereupon the top assumes its retracted position shown in Figure 3. As shown in Figure 3, the container top now has a flattened corrugated surface, preferably, although not necessarily, level with the top of the contents of the container.

The container top 2 may be equipped with a small hole 8 to allow the entrapped air in the empty space to escape when the top is collapsed, thereby permitting it to be crushed evenly. As shown in Figures 1, 2 and 3, this hole has been made in the corrugated container top. It may be provided in the lid 10 with identical results.

Figure 5 discloses an alternative form of lid or cover 14 such as is ordinarily used in the packaging of liquids in a metal drum. The cap 14 engages in screw thread relation with a flange 15 made of a somewhat heavier gage metal than the corrugated top 2 and equipped with screw thread 16. The flange 15 may be fastened to the container top 2 in any suitable manner, such as by sweating or welding it as at 17. As is customary, the cap 14 is provided with a square sided recessed portion 18 for receiving a wrench to tightly fasten the cap. This type of cap is preferred when the container is filled with a liquid which does not solidify upon cooling but which when inserted is in a hot expanded condition and contracts considerably upon cooling. The container top is of course not provided with a vent opening shown in Figures 1, 2 and 3 but is necessarily air tight.

In the packaging of materials of this nature, the cap 14 may be inserted and the container sealed while the contents are still in the hot expanded condition. As the contents contract upon cooling, a vacuum is created in the container which may of itself create enough difference in pressure so that the atmospheric conditions on the outside of the container are great enough to collapse the container top. However, the entire sealed container may be stood on end to aid the top in assuming its retracted position as shown in Figures 3 and 7.

As shown in Figures 6 and 7, the container end may be made with a flat rigid portion 20, corrugated only near the cover 10 in the end. The corrugated portion is capable of being collapsed to assume a flattened retracted position as shown in Figure 7. This arrangement of structure is especially adapted to the packaging of materials which do not contract or settle to an extent sufficient to permit the entire container end to assume a flattened position from an original distended position as shown in Figures 1, 2, 4 and 5. It also permits a more rigid construction since the portion 20 of the container end may be tempered or made of a heavier gage metal than the corrugated portion. Thus in the end on end stacking of the containers the container end will be rigid enough to support a great load by itself.

It is to be understood that my invention contemplates the use of any shaped container and that the design of container top or end may be widely varied without departing from the principles of this invention. Any type of joint to secure the container top or end to the body of the container may be used, such as, for example, a welded joint or a detachable rim commonly used on drums or barrels to removably secure the head to the container itself. Any type of lid or cover may be used in the container head or end.

In general, my invention contemplates the use of any type of container top or end which is capable of assuming a retracted collapsed position without damage to the container in any manner.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A container for packaging rosin and the like which comprises a metallic drum having rigid side and bottom walls, a dome-shaped corrugated top capable of readily assuming a flattened position by collapsing the corrugations without weakening the structure, a flanged opening defined by the top for permitting the filling of the container, a rigid cover for said opening to seal the drum and a vent in said top to allow the escape of entrapped air in the drum.

2. A container for packaging rosin and the like materials which comprises, a metallic receptacle having a substantially flat bottom, a top for said receptacle, a dome portion near the center of said top, rounded concentric corrugations in the sides of said dome portion capable of being collapsed without weakening the structure so that the dome may assume a flat position level with the top, an opening for filling the container in the top of said dome portion, sealing means for said opening, and a vent to allow the escape of entrapped air in the container.

3. A container for packaging rosin and like materials, comprising a metallic receptacle having a side wall and a flat bottom, a dome shaped top secured to the top of said side wall having a filling opening therein, a closure therefor, said dome being formed with a plurality of concentric corrugations presenting towards the base of the dome a plurality of concentric zones of consecutively increasing diameter, the crests and troughs of which are continuous and substantially uniform in curvature and may be flexed to depress said dome without substantially weakening the structure.

4. A container comprising a metallic receptacle having a side wall and a supporting bottom wall, a dome-shaped top secured to the top of said side wall having a filling opening therein, a closure therefor, said dome being formed of sheet metal with a plurality of concentric corrugations presenting towards the base of the dome a plurality of concentric zones of consecutively increasing diameter, the crests and troughs of which are continuous in curvature and may be flexed to depress said dome.

5. A dome-shaped metallic container top designed for securing to a container body, the top of the dome having a filling opening therein, a closure for said opening, said dome being formed with a plurality of concentric corrugations presenting towards the base of the dome a plurality of concentric zones of consecutively increasing diameter, the crests and troughs of which are continuous in curvature and may be flexed to depress said dome.

JOSEPH P. ALEXANDER.